United States Patent [19]
Muraishi et al.

[11] Patent Number: 4,848,795
[45] Date of Patent: Jul. 18, 1989

[54] AUTOMOTIVE SEAT BELT DEVICE

[75] Inventors: Masakazu Muraishi; Akihiro Hashimoto; Kenro Otsuka, all of Kanagawa, Japan

[73] Assignee: Nissan Motor Company, Limited, Japan

[21] Appl. No.: 104,121

[22] Filed: Oct. 5, 1987

[30] Foreign Application Priority Data

Oct. 6, 1986 [JP] Japan ................................. 61-153483

[51] Int. Cl.⁴ ............................................. B60R 22/34
[52] U.S. Cl. .................................. 280/801; 180/268; 280/807; 297/479
[58] Field of Search ................................ 280/802–806, 280/801; 16/94 R; 297/216, 480, 470, 468, 479; 180/268

[56] References Cited

U.S. PATENT DOCUMENTS

| | | | |
|---|---|---|---|
| 4,384,735 | 5/1983 | Maeda et al. | 280/807 |
| 4,659,108 | 4/1987 | Sack et al. | 280/807 |
| 4,738,485 | 4/1988 | Rumpf | 280/807 |

Primary Examiner—Richard A. Bertsch
Attorney, Agent, or Firm—Lowe, Price, LeBlanc, Becker & Shur

[57] ABSTRACT

A seat belt device has a belt retractor mounted on a vehicular seat from. The belt retractor employs an ELR mechanism for locking a seat belt upon emergency condition. The seat belt device employs and electrically operable actuator in cooperation with the ELR mechanism. The actuator is operable in response to a switch which is turned ON by manual seat slide lock release operation. This allows seat position adjusting operation without causing locking of the seat belt.

24 Claims, 3 Drawing Sheets

AUTOMOTIVE SEAT BELT DEVICE

BACKGROUND OF THE INVENTION

1. Field of the Invention

The present invention relates generally to a seal belt device for an automotive vehicle for restricting a vehicular seat occupant on a seat upon an accident and so so forth. More specifically, the invention relates to an automotive seat belt device with a seat belt retractor having an emergency locking mechanism (ELR mechanism) which is disabled locking while a seat slide arrangement of an automotive seat device is operated for adjustment of the seat position.

2. Description of the Background Art

In general, the automotive seat belt device includes a belt retractor for detecting rapid deceleration of the vehicle, such as upon an accident, so as to lock the seat belt for restricting the passanger or seat occupant on the seat. The belt retractor is provided with the ELR mechanism for detecting the rapid deceleration by detecting inertia and/or extraction speed of the seat belt for causing locking. Among various constructions of the seat belt devices, there are some seat belt devices which mount the belt retractors on seat slide mechanisms, such as passive-type seat belt devices. Usually, in such case, the belt retractor is fixed on a transverse side portion of a seat frame. Such belt retractor tends to erroneously detect emergency condition during seat position adjustment, in which the seat frame is moved in longitudinal direction. Erroneous detection of the emergency condition causes locking of the belt to unnecessarily restrict the seat occupant during seat position adjustment. This is quite uncomfortable.

In order to prevent the seat belt retractor from erroneously locking the belt during seat position adjusting operation, the Japanese Patent First (unexamined) Publication (Tokkai) Showa 58-122241 proposes a seat belt device with a belt retractor which is coupled with a seat slide arrangement for preventing the retractor from causing locking while a seat slide lever is operated. In the shown construction, a lock disabling member is provided in the belt retractor for disabling operation of the ELR mechanism. The lock disabling member is associated with a seat slide lever of the seat slide arrangement via a kind of linking member. When the seat slid lever is operated, the lock disabling member is also operated via the linking member for restricting operation of the ELR mechanism of the belt retractor for allowing seat position adjustment without causing locking of the seat belt.

Such type of the belt retractor has a drawback in complicated construction. Namely, as is well known, the belt retractor generally has relatively complicated and complex construction even without the lock disabling member. On the other hand, in order to enable the belt retractor to be mounted on the seat frame, the size of the retractor assembly has to be small enough. Therefore, difficulty is encountered to introduce the lock disabling member in the belt retractor. Furthermore, making the construction of the belt retractor more complicated may cause increase of the parts and make it difficult to assembling the retractor.

SUMMARY OF THE INVENTION

Therefore, it is an object of the present invention to provide a seat belt device which can prevent a belt retractor from locking during seat position adjustment with simplified construction.

Another object of the invention is to provide a seat belt device which includes an emergency locking disabling means operable in response to a seat slide lock release operation.

A further object of the invention is to provide an electrically operable means which can disable locking of an ELR mechanism in the seat belt device when the seat slide lock release operation is performed, with simplified construction.

A still further object of the invention is to provide a combination of a seat belt retractor and a seat slide mechanism, which can prevent the seat belt retractor from erroneous locking during seat position adjusting operation, without requiring complicated mechanical construction which interfers making the seat belt retractor compact.

In order to accomplish the aforementioned and other objects, a seat belt device, according to the present invention, employs an electrically operable actuator in cooperation with an ELR mechanism of a belt retractor. The actuator is connected to a seat slide switch which turns ON in response to manual operation of a seat slide lever to be activated for disabling locking operation of the ELR mechanism.

According to one aspect of the invention, a seat belt device for an automotive vehicle comprises a seat belt retractor unit for extracting and retracting a seat belt, the retractor unit including an emergency locking mechanism responsive to rapid deceleration of the vehicle establish locking of the belt for preventing the belt from being extracted, a seat slide detector switch means, provided in a seat slide mechanism of an automotive seat arrangement for detecting a lock release condition of the seat slide mechanism for producing an electric signal indicative of the lock release condition of the seat slide mechanism, and an actuator means, associated with the emergency locking mechanism and responsive to the electric signal, for disabling operation of the emergency locking mechanism while the electric signal exists.

According to another aspect of the invention, a seat belt device for an automotive vehicle comprises a seat belt retractor unit including a reel on which a seat belt is wound, the belt reel being rotatable in a first direction for extracting the belt therefrom and in a second direction for retracting the belt, the retractor unit including an emergency locking mechanism associated with the belt reel and responsive to rapid deceleration of the vehicle to establish locking of the belt reel for preventing the belt reel from rotating in the first direction, which seat belt retractor is mounted on a frame work of an automotive seat arrangement, a seat slide detector switch means, provided in a seat slide mechanism of the automotive seat arrangement and associated with a manually operable seat slide lock release member to detect the position of the seat slide lock release means for detecting a lock release condition of the seat slide mechanism for producing an electric signal indicative of the lock release condition of the seat slide mechanism, and an actuator means, associated with the emergency locking mechanism and responsive to the electric signal, for disabling operation of the emergency locking mechanism while the electric signal exists.

The emergency locking mechanism may include a rotary wheel member which is rotatable with the belt reel and a sensor means for monitoring inertia condition, and a locking member associated with the rotary wheel for establishing locking engagement with the rotary wheel for preventing the belt reel from rotating in belt extracting direction, and the actuator means restricts movement of the locking member for disabling locking of the emergency locking mechanism in response to the electric signal. The actuator means comprises an electromagnetically operable solenoid movable between a normal position allowing inertia responsive movement of the locking member to establish locking engagement with the rotary wheel and a lock disabling position for restricting movement of the locking member.

On the other hand, the seat slide detector switch means may comprise an ON/OFF switch, plunger associated with the On/OFF switch and movable between a seat slide locking position in which the switch is held OFF and a seat sliding position in which the switch is turned ON, and an actuation member cooperative with a seat slide lock releasing member to operate the plunger between the seat slide locking position and the seat sliding position.

According to a further aspect of the invention, a combination of an automotive seat belt device and an automotive seat arrangement, in which a seat belt retractor is mounted on a seat frame and movable with the seat frame, which combination includes a system for disabling seat belt locking operation of the seat belt retractor while a seat slide mechanism is operated at seat position adjusting position, the seat belt locking disabling system comprises an emergency locking mechanism incorporated in the seat belt retractor for establishing locking of the seat belt in response to a rapid deceleration of the vehicle with a deceleration magnitude greater than a preset value, a seat slide detector switch means, provided in a seat slide mechanism of the automotive seat arrangement for detecting a seat slide lock release condition of the seat slide mechanism for producing an electric signal indicative of the lock release condition of the seat slide mechanism, and an actuator means, associated with the emergency locking mechanism and responsive to the electric signal, for disabling operation of the emergency locking mechanism while the electric signal exists.

According to a still further aspect of the invention combination of an automotive seat belt device and an automotive seat arrangement, in which a seat belt retractor is mounted on a seat frame and movable with the seat frame, which combination includes a system for disabling seat belt locking operation of the seat belt retractor while a seat slide mechanism is operated at seat position adjusting position, the seat belt locking disabling system comprises the seat belt retractor unit including a reel on which a seat belt is wound, the belt reel being rotatable in a first direction for extracting the belt therefrom and in a second direction for retracting the belt, the retractor unit including an emergency locking mechanism associated with the belt reel and responsive to rapid deceleration of the vehicle to establish locking of the belt reel for preventing the belt reel from rotating in the first direction, which seat belt retractor is mounted on a framework of an automotive seat arrangement, a seat slide detector switch means, provided in a seat slide mechanism of the automotive seat arrangement and associated with a manually operable seat slide lock release member to detect the position of the seat slide lock release means for detecting a lock release condition of the seat slide mechanism for producing an electric signal indicative of the lock release condition of the seat slide mechanism, and an actuator means, associated with the emergency locking mechanism and responsive to the electric signal, for disabling operation of the emergency locking mechanism while the electric signal exists.

According to a yet further aspect of the invention, a combination of an automotive seat belt device and an automotive seat arrangement, in which a seat belt retractor is mounted on a seat frame and movable with the seat frame, which combination includes a system for disabling seat belt locking operation of the seat belt retractor while a seat slide mechanism is operated at seat position adjusting position, the seat belt locking disabling system comprises an emergency locking mechanism incorporated in the seat belt retractor for establishing locking of the seat belt in response to a rapid deceleration of the vehicle with a deceleration magnitude greater than a preset value, the emergency locking mechanism includes a locking member pivotable between a locking position and unlocking position, and an inertia sensing means which is responsive to an inertia moment to be exerted on the vehicle by rapid deceleration of the vehicle in a magnitude greater than the preset value, the inertia sensing means responsive to the inertia moment greater than a given magnitude which corresponds to the preset deceleration value to pivotally operate the locking member in locking direction from the unlocking position to the locking position, a seat slide detector switch means, provided in a seat slide mechanism of the automotive seat arrangement for detecting a seat slide lock release condition of the seat slide mechanism for producing an electric signal indicative of the lock release condition of the seat slide mechanism, and an actuator means, associated with the locking member of the emergency locking mechanism and responsive to the electric signal, for preventing pivotal movement of the locking member in locking direction for disabling operation of the emergency locking mechanism while the electric signal exists.

According to a still further aspect of the invention, a combination of an automotive seat belt device and an automotive seat arrangement, in which a seat belt retractor is mounted on a seat frame and movable with the seat frame, which combination includes a system for disabling seat belt locking operation of the seat belt retractor while a seat slide mechanism is operated at seat position adjusting position, the seat belt locking disabling system comprises the seat belt retractor unit including a reel on which a seat belt is wound, the belt reel being rotatable in a first direction for extracting the belt therefrom and in a second direction for retracting the belt, the retractor unit including an emergency locking mechanism incorporated in the seat belt retractor for establishing locking of the seat belt in response to a rapid deceleration of the vehicle with a deceleration magnitude greater than a preset value, the emergency locking mechanism includes a locking member pivotable between a locking position and unlocking position, and an inertia sensing means which is responsive to an inertia moment to be exerted on the vehicle by rapid deceleration of the vehicle in a magnitude greater than the preset value, the inertia sensing means responsive to the inertia moment greater than a given magnitude which correspond to the preset deceleration value to pivotally operate the locking member in locking direction from the unlocking position to the locking position, a seat slide detector switch mens, provided in a seat slide mechanism of the automotive seat arrangment and associated with a manually operable seat slide lock release member to detect the position of the seat slide lock release means for detecting a lock release condition of the seat slide mechanism for producing an electric signal indicative of the lock release condition of the seat slide mechanism, and an actuator means, associated with the emergency locking mechanism and responsive to the electric signal, for disabling operation of the emergency locking mechanism while the electric signal exists.

DESCRIPTION OF THE PREFERRED EMBODIMENT

Figure 1:
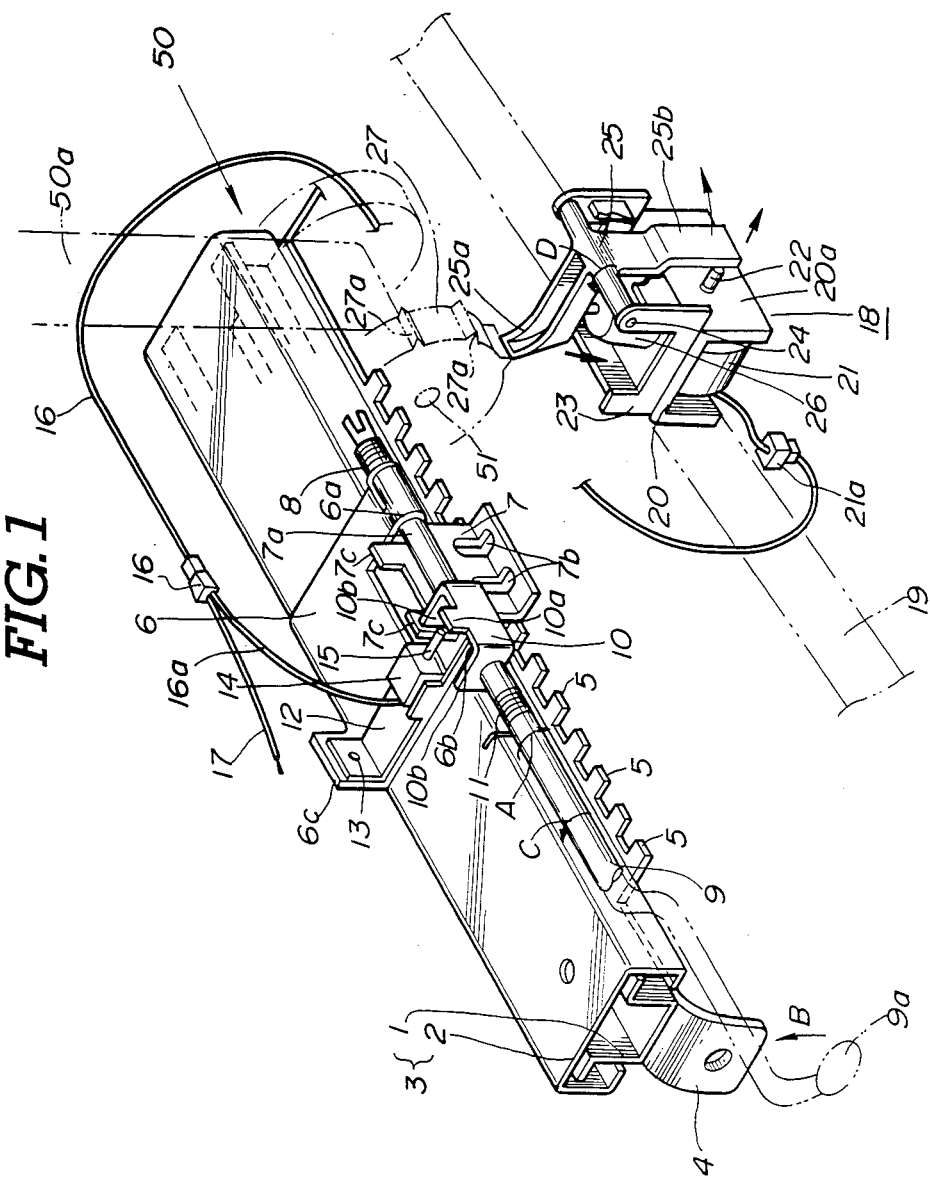
FIG. 1 is a perspective view of the preferred embodiment of a seat belt device which includes a seat belt retractor mounted on a seat frame of a vehicular seat arrangement including a seat slide arrangement, in which part of the seat belt retractor is explanatory illustrated in schematic manner.

Refering now to the drawings, particularly to FIG. 1, the preferred embodiment of a seat belt device according to the invention, includes a seat belt retractor associated with a seat slide arrangement 2 for an automotive seat arrangement. In the particular embodiment, the seat belt retractor is mounted on one transverse side portion of a seat frame of the automotive seat arrangement. Such arrangement of the seat belt retractor may be applicable for a passive-type seat belt device which operates a seat belt between release position and fitted position according to vehicular door opening and closing operation. Of course, the arrangement of the seat belt retractor may be applicable for manually fitting type seat belt device. Though the accompanying drawings does not clearly show, the seat belt has an end remote from the seat belt retractor to be associated with an anchor of the seat belt or slider block which is slidable along the upper edge of the vehicular door opening. The preferred construction of the seat belt device according to the invention, which will be illustrated herebelow in terms of the preferred embodiment should be appreciated to be applicable of any types of automotive seat belt device.

Figure 2:
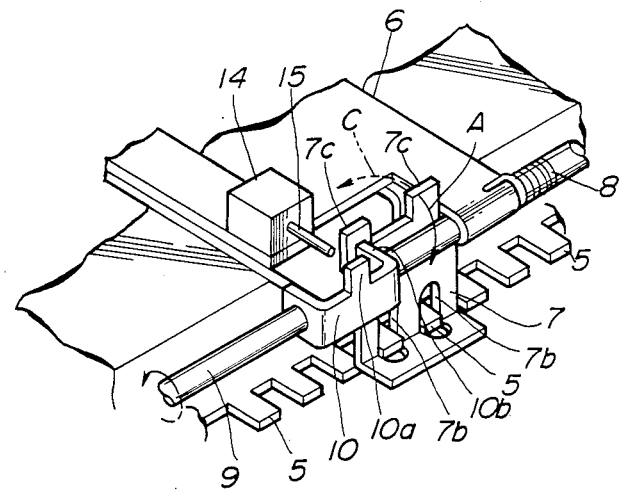
FIG. 2 is a partial perspective view of the seat slide arrangement, to which a seat belt locking disabling switch is provided in cooperation with a seat slide lock mechanism operable between locking position and unlocking position.
Figure 3:
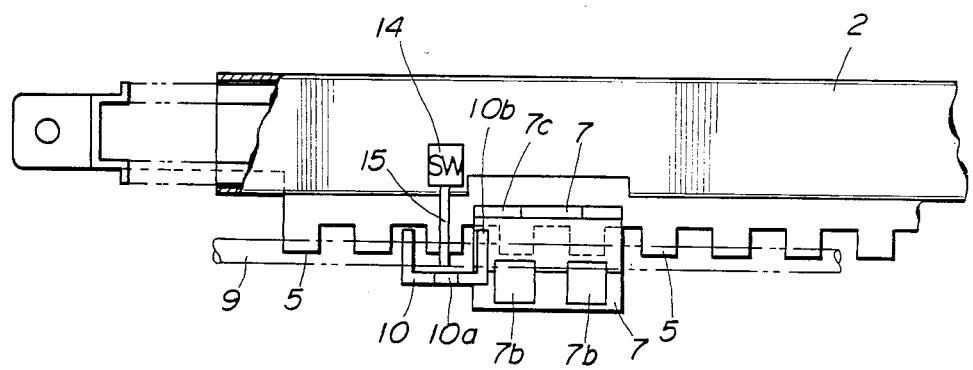
FIG. 3 is a partial section plan view of the seat slide arrangement.
Figure 4:
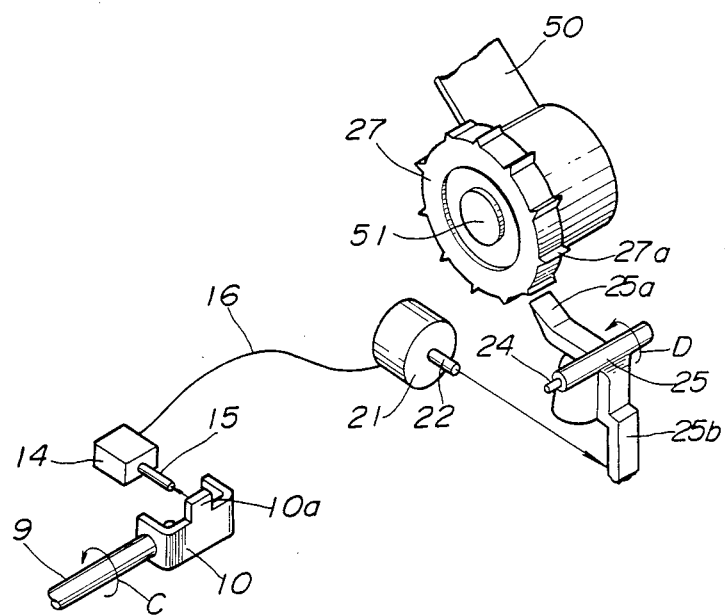
FIG. 4 is a fragmentary perspective view of the major part of the preferred embodiment of the seat belt retractor.

The seat slide arrangement comprises a stationary lower seat slide rail 1 and a movable upper seat slide rail 2. As will be seen from FIGS. 1 and 2, the lower seat slide rail 1 is formed into essentially U-shaped configuration. The lower seat slide rail 1 has a horizontally extending section which lies parallel to a vehicular floor and vertical wall sections upwardly extending from both transverse edges of the horizontally extending sections. The lower seat slide rail 1 is also provided with transversely extending flange portions which extends horizontally and transversely from the upper edge of the vertical wall sections. The lower seat slide rail 1 is further provided with mounting bracket 4. The mounting bracket 4 is fixed onto a floor of the vehicle body (not shown) so as to fixedly secure the lower slide rail 1 on the floor.

The mounting bracket 4 is of essentially elongated flat plate form and rigidly fixed to the lower surface of the horizontally extending major section of the lower rail 1. The mounting bracket 4 is formed with a plurality of notches to define therebetween seat slide locking teeth 5 aligned along one transverse edge thereof. The seat sliding locking teeth 5 are arranged at a given regular intervals so that the interval therebetween will define the minimum seat position adjustment distance.

On the other hand, the upper seat slide rail 2 is of generally C-shaped configuration to have longituginally extending flanges at both transverse side edge portions thereof. The upper seat slide rail 2 is provided with a horizontally extending major section which lies substantially parallel to the lower surface of the associated section of the seat frame of the automotive seat arrangment. Vertical wall sections are downwardly extended from transverse edges of the horizontally extending major section. The flanges extend inwardly and horizontally from the lower edge of the vertical wall sections. The horizontally extending major section of the upper seat slide rail 2 is rigidly secured to the seat frame so that the automotive seat may be movable in longitudinal direction of the vehicle for allowing adjustment of the seat position.

The upper seat slide rail 2 is slidably engaged with the lower seat slide rail 1 so that it may move along th lower seat slide rail, with the automotive seat for adjustment of the seat position. The flange portions of the upper seat slide rail 2 overlap with the flange portion of the lower seat slide rail 1 in spaced apart relationship to each other for defining therebetween enclosed spaces for receiving seat slide bearings (not shown) therein when the upper seat slide rail 2 is assembled with the lower seat slide rail 1. Also, the horizontally extending major section of the upper seat slide rail 2 opposes the horizontally extending major section of the lower seat slide rail 1 in spaced apart relationship to define a space for receiving a seat slide roller assembly (not shown) therein. Therefore, the upper sear slide rail 1 is thrustingly and smoothly movable along the lower seat slide rail 1 for allowing adjustment of the seat position.

In order to lock the upper seat slide rail 2 at a desired position with respect to the lower seat slide rail 1, a seat slide lock mechanism is provided. The seat slide lock mechanism is cooperative with the locking teeth 5 of the mounting bracket 4. The seat slide locking mechanism includes a lever bracket 6. The lever bracket 6 is of generally flat plate shaped configuration having a flat major section mating with the flat upper surface of the horizontally extending major section of the upper seat slide rail 2. The flat major section of the lever bracket 6 is rigidly fixed to the upper seat slide rail 2, at about the longitudinal center of the upper seal slide rail. The lever bracket 6 has cylindrically bent transverse cylindrical end portions 6a and 6b which define cylindrical openings. Between the cylindrical end portions 6a and 6b, a cut-out is formed. The cylindrical end portions 6a and 6b are designed to rotatably receive a lock shaft 7a, to which a seat slide locking member 7 is rigidly secured for pivotal movement according to rotational movement of the lock shaft. The rear end portion of the lock shaft 7a extends from the cylindrical end portion 6a of the lever bracket 6, which cylindrical end portion is oriented at rear side relative to another cylindrical end portion 6a. The seat slide locking member 7 of generally crank shaped configuration defining a cross-sectionally semi-circular section which is so configured as to conform with the lock shaft 7a. The lock shaft 7a rigidly engages with the semi-circular section for rigidly securing the locking member 7 on the lock shaft for pivotal movement according to rotation of the lock shaft 7a.

A torsion coil spring 8 is wound around the rear end portion of the lock shaft 7a, which extends rearwardly from the cylindrical end portion 6a of the lever bracket 6. The lock shaft 7a is formed with a rest or slit at rear end in order to receive one end of the torsion coil spring 8. The other end of the torsion coil spring 8 is engaged to the cylindrical end portion 6a. Therefore, torsional spring force is exerted to the lock shaft 7a for normally biasing the locking member 7 at predetermined initial position where locking of the seat belt is not established.

The section of the locking member 7 extending downwardly from the joining section between the locking member and the lock shaft 7a is bent to configurate generally L-shaped lower end in cross-section. Elongated openings 7b are formed through the downwardly extending section of the locking member 7. The elongated openings 7b respectively have a width substantially corresponding to the width of each of individual looking teeth 5 of the mounting bracket. The elongated openings 7b extend across the bent corner of the downwardly extending section in parallel relationship to each other. The distance between the locking openings 7b thus corresponds to the interval of the seat slide locking teeth 5 so that the locking openings 7b receive adjacent pair of seat slide locking teeth 5. With this arrangement, the elongated openings 7b may receive adjacent pair of locking teeth 5 at normal position. At the position where the locking teeth 5 engage with the elongated openings 7b, the peripheral edge of the elongated openings 7b contact with the mating edges of the associated locking teeth 5 for restricting longitudinal movement of the locking member together with the lever bracket 6 and the upper seat slide rail.

The locking member 7 also has upwardly extending claw sections 7c. The upwardly extending claw sections 7c have vertical length substantially equal to or shorter than the depth of the cut-out or recessed portion defined between the cylindrical end portions 6a and 6b of the lever bracket.

The lock shaft 7 is connected to a seat slide lock release lever 9. The rear end of the seat slide lock release lever 9 is rigidly connected to the lock shaft 7a so that it may transmit rotational force to the lock shaft for rotation therewith. The fron end of the seat slide lock release lever 9 extends frontwardly and connected to a manually operable handle 9a at the front end thereof. The manually operable handle 9a is bent transversely for exerting rotational torque in seat slide lock release direction (in counterclockwise direction in FIG. 1) to the seat slide lock release lever 9. A torsion coil spring 11 is wound around the rear end portion of the seat slide lock release lever 9. One end of the torsion coil spring 11 is rigidly secured onto the seat slide lock release lever 9 and the other end is seated on the upper seat slide rail. Therefore, the torsion coil spring 11 exerts biasing force in clockwise direction A in FIG. 1 for normally placing the locking member 7 at the locking position. The torsion coil spring 11 is thus cooperative with the torsion coil spring 8 for determining the seat slide locking force so that the seat slide lock mechanism will not be accidentally unlocked in response to substantial force to be exerted on the automotive seat in longitudinal direction, such as at the traffic accident.

An actuation member 10 is fixed to the seat slide lock release lever 9 for pivotal movement according to rotational movement of the seat slide lick release lever. The actuation member 10 is of generally C-shaped configuration in plan view having a longitudinally extending section extending in parallel to the seat slide lock release lever axis and transversely extending sections transversely extending from front and rear ends of the longitudinally extending section. The transversely extending sections are formed of circular openings through which the seat slide lock release lever extends. The actuation member 10 has an upwardly projecting actuation strip 10a extending upwardly from the upper edge of the longitudinally extending section. On the other hand, the rear transversely extending section is represented by the reference numeral 10b. The transverse edge portion of the transversely extending section 10b mates with the one of upward extending section 7c of locking member, which the upwardly extending sections mating with the transversely extending section is oriented at front side relative to the other upwardly extending section.

The actuation strip 10a of the actuation member 10 opposes an end of a plunger 15 of a seat slide lock release detector switch 14. The seat slide lock release detector switch 14 is mounted on a mounting bracket 12. The mounting bracket 12 is of elongated plate form and extends transversely. The mounting bracket 12 has an upwardly bent end portion 13. The mounting bracket 12 is fitted on the upper surface of the lever bracket 6 and fixedly secured thereonto by fixing the upwardly bent end section to an upwardly extending vertical strip section 6c formed with the lever bracket 6 at the transverse side remote from the side where the locking member 7 is oriented, by means of a fastening screw 14.

While the manually operable lever 9a is not operated and thus the seat slide lock mechanism is maintained at locking position, the actuation strip 10a is held away from the end of the plunger 15. At this condition, the seat slide lock release detector switch 14 is held OFF. On the other hand, when the manually operable lever 9a is pivotally operated in counterclockwise direction to cause rotation of the seat slide lock release lever 9 in the lock releasing direction C, the actuation member 10 and the lever shaft 7a are rotated at the corresponding direction. This causes counterclockwise pivotal movement of the locking member 7 to release locking engagement between the elongated openings 7a and the locking teeth 5. This allows the upper seat slide rail 2 with the automotive seat to thrusting move along the lower seat slide rail 1 for adjustment of the seat position.

On the other hand, by pivotal movement of the actuation member 10 in counterclockwise direction, the actuation strip 10a comes into contact to the mating end of the plunger of the seat slide lock release detector switch 14. The seat slide lock release detector switch 14 is thus turned ON by the stroke of the plunger 15 as depressed by the actuation strip 10a.

As is well known, the manually operable handle 9a is held at the counterclockwise pivoted position while the seat position is adjusted. As long as the manually operable handle 9a is held at pivoted position, the locking membr 7 is also held at lock release position. At the same time, the actuation member 10 is also held at pivoted position to maintain depression of the plunger 15 of the seat slide lock release detector switch 14 via the actuation strip 10a. As a result, the seat slide lock release detector switch 14 is held ON.

The seat slide lock release detector switch 14 is connected to a wire harness 16 via a lead line 16a and a connector 16b. The wire harness 16 is also connected to a power source, i.e. vehicular battery (not shown) via a wire harness 17. The wire harness 16 is, in turn, connected to an electromagnetic actuator 18 which is associated with a seat belt retractor unit.

The seat belt retractor unit comprises a belt reel assembly 50 which has a reel shaft 51, around which a seat belt 50a is wound. Rotary wheels are fixed on both ends of the reel shaft 51. One of the rotary wheels is formed of a plurality of ratchet teeth 27a and thus serves as ratchet wheel 27. This ratchet wheel 27 is associated with an inertia responsive emergency locking assembly. The emergency locking assembly includes an essentially L-shaped locking member 25. The locking member 25 has a transversely latching claw 25a which is normally placed to extend in substantially horizontal position, and an actuator strip 25b extending substantially in vertical direction. The actuator strip 25c joins with the latching claw 25a perpendicularly to each other. The locking member 25 is pivotable about a pivot 24 to be moved between a normal and inoperative position, in which the latching claw 25a is held away from the ratchet wheel 27 and a operative or locking position wherein it is engageable to the ratchet teeth 27a of the ratchet wheel 27 for establishing locking engagement.

A cylindrical section 25c extends longitudinally from both side edges of joining portion between the latching claw 25a and the actuation strip 25b of the locking member. The pivot pins 24 extend through the cylindrical section 25c to pivotably support the locking member in a sensor casing 23, which sensor casing is fixed to a holder 20. The holder 20 is formed into generally C-shaped configuration to have horizontally extending section and vertically extending sections extending downwardly from both ends of the horizontally extending section. The horizontally extending section of the holder 20 supports the sensor casing 23 fixed thereonto. On the other hand, one of the vertically extending section is rigidly secured onto the seat frame 19 of the automotive seat arrangement.

The sensor casing 23 movably supports an inertia sensing weight 26 which serves as an inertia sensor for detecting inertia moment at a magnitude greater than a preset value exerted on the vehicle. The inertia sensing weight 26 has a projection upwardly extending from the top of an inertia sensing weight body. The top end of the projection of the inertia sensing weight mates with the lower surface of the latching claw 25a. The inertia sensing weight 26 is normally placed at substantially vertical position. In response to the inertia moment greater than the preset magnitude, the inertia sensing weight 26 is moved at inclined position to cause pivotal movement of the locking member 25 in counterclockwise direction. This counterclockwise pivoted position serves as locking position of the locking member 25. At the locking position of the locking member 25, the latching claw 25a is lifted upwardly to engage with one of the ratchet teeth 27a of the ratchet wheel 27 in order to establish the locking engagement.

The electromagnetic actuator 18 comprises an electromagnetically operable solenoid 21 disposed within the space defined within the holder 20 and supported therein. The solenoid 21 has a plunger 22 extending through one of the vertical wall section of the holder 20, which vertical wall section is remote from the seat frame and opposing the actuator strip 25b of the locking member. The free end of the plunger 22 opposes to the actuator strip 25b of the locking member 25. The solenoid 21 is connected to the ON/OFF switch 14 via the wire harness 16 and via a connector 21a. The solenoid 21 maintains the plunger 22 away from the actuator strip 25b while it is held deenergized condition. On the other hand, the solenoid 21 operates the plunger 22 toward the actuator strip 25b as energized in response to HIGH level signal from the seat slide lock release detector switch 14 via the wire harness 16 and the connector 21a.

In the normal vehicle driving condition, the inertia sensor continuously monitors the inertia moment exerted on the vehicle. The mass weight of the inertia sensing weight is selected to determine the aforementioned preset magnitude of the inertia moment. Therefore, as long as the magnitude of the inertia moment exerted on the vehicle is smaller than the preset magnitude, the inertia sensing weight 26 is held at vertical position. Therefore, the projection of the inertia sensing weight is held in operative position to hold the locking member 25 at the initial and lock releasing position. At this position, the reel shaft 51 with the ratchet wheel 27 is free for rotation and thus allows extraction of the seat belt 50a from the seat belt retractor unit. On the other hand, when the inertia moment, magnitude of which is greater than the preset magnitude is exerted on the vehicle, such as in the rapid deceleration of the vehicle, the inertia sensing weight is moved to the inclined position. By this movement of the inertia sensing weight, the projection of the inertia sensing weight causes clockwise pivotal movement of the locking member 25 to lift the latching claw 25a upwardly. The latching claw 25a thus lifted comes into engagement with one of the ratchet teeth 27a of the ratchet wheel 27. This locks the ratchet wheel 27 to prevent the ratchet wheel and the reel shaft 51 from rotating in belt extracting direction.

On the other hand, when the manually operable handle 9a is operated to rotate the seat slide lock release lever 9 in the lock release direction C, the actuator strip 10a of the actuation member 10 is likewise pivoted in lock release direction C. Therefore, the actuation strip 10a comes into contact with the plunger 15 to turn the seat slide lock release detector switch 14 ON. Therefore, the HIGH level signal is applied to the solenoid 21. Thus the solenoid 21 is energized to push the actuation strip 25a to pivotably move the locking member 25 in a direction D of FIG. 1. This moves the latch 25a away from the ratchet wheel 27. The switch 14 is held ON as long as the seat slide lock release lever 9 is held at a position releasing the seat slide lock. Therefore, during seat position adjustment, locking of the seat belt retractor is prevented thereby avoiding uncomfortable locking of the seat belt during seat position adjustment.

As long as the manually operable lever 9a is held at counterclockwise pivoted position, the locking member 25 is held at counterclockwise pivoted position to place the latching claw 25a away from the ratchet wheel. Therefore, even when the automotive seat is slidingly moved at relatively high speed in seat position adjustment to cause inertia moment greater than the preset magnitude on the seat belt retractor, locking of the seat belt never occurs. This frees the seat occupant from unnecessary restriction by the seat belt which might be caused by sensing of the inertia moment created by quick movement of the seat in seat position adjustment.

According to the present invention, since the disabling of the emergency locking operation is performed by electrically operated solenoid, the mechanical construction required for lock disabling operation in response to the seat position adjusting operation, can be simple enough to make the seat belt retractor compact. Also, such simplified construction of the seat belt retractor make it easy to operation.

Therefore, the present invention fulfills all of the objects and advantages sought therefor.

What is claimed is:

1. A seat belt device for an automotive vehicle comprising:
   a seat belt retractor unit for extracting and retracting a seat belt, said retractor unit including an emergency locking mechanism responsive to rapid deceleration of the vehicle to establish locking of the belt for preventing the belt from being extracted;
   a seat slide detector switch means, provided in a seat slide mechanism of an automotive seat arrangement for detecting a lock release condition of the seat slide mechanism for producing an electric signal indicative of the lock release condition of the seat slide mechanism; and
   an electrically operable actuator means associated with said emergency locking mechanism and responsive to said electric signal to be triggered to disable operation of said emergency locking mechanism while said electric signal exists.

2. A seat belt device as set forth in claim 1, wherein said emergency locking mechanism includes a rotary wheel member which is rotatable with a belt reel and a sensor means for monitoring inertia condition, and a locking member associated with said rotary wheel for establishing locking engagement with said rotary wheel for preventing said belt reel from rotating in belt extracting direction, and said actuator means restricts movement of said locking member for disabling locking of said emergency lock mechanism in response to said electric signal.

3. A seat belt device as set forth in claim 2, wherein said actuator means comprises electromagnetically operable solenoid movable between a normal position allowing inertia responsive movement of said locking member to establish locking engagement with said rotary wheel and a lock disabling position for restricting movement of said locking member.

4. A seat belt device as set forth in claim 3, wherein said seat slide detector switch means comprises an ON/OFF switch, plunger associated with said ON/OFF switch and movable between a seat slide locking position in which said switch is held OFF and a seat sliding position in which said switches is turned ON, and an actuation member cooperative said plunger between said seat slide locking position and said seat sliding position.

5. A seat belt device for an automotive vehicle comprising:
   a seat belt retractor unit including a reel on which a seat belt is wound, said belt reel being rotatable in a first direction for extracting the belt therefrom and in a second direction for retracting the belt, said retractor unit including an emergency locking mechanism associated with said belt reel and responsive to rapid deceleration of the vehicle to establish locking of said belt reel for preventing said belt reel from rotating in said first direction, which seat belt retractor is mounted on a framework of an automotive seat arrangement;
   a seat slide detector switch means, provided in a seat slide mechanism of said automotive seat arrangement and associated with a manually operable seat slide lock release member to detect the position of the seat slide lock release mechanism for detecting a lock release condition of the seat slide mechanism for producing an electric signal indicative of the lock release condition of the seat slide mechanism; and
   an electric actuator means, associated with said emergency locking mechanism and responsive to said electric signal, for disabling operation of said emergency locking mechanism while said electric signal exists.

6. A seat belt device as set forth in claim 5, wherein said emergency locking mechanism includes a rotary wheel member which is rotatable with said belt reel and a sensor means for monitoring inertia condition, and a locking member associated with said rotary wheel for establishing locking engagement with said rotary wheel for preventing said belt reel from rotating in belt extracting direction, and said actuator means restricts movement of said locking member for disabling locking of said emergency lock mechanism in response to said electric signal.

7. A seat belt device for an automotive vehicle comprising:
   a seat belt retractor unit including a reel on which a seat belt is wound, said belt reel being rotatable in a first direction for retracting the belt, said retractor unit including an emergency locking mechanism associated with said belt reel and responsive to rapid deceleration of the vehicle to establish locking of said belt reel for preventing said belt reel from rotating in said first direction, which seat belt retractor is mounded on a framework of an automotive seat arrangement;
   a seat slide detector switch means, provided in a seat slide mechanism of said automotive seat arrangement and associated with a manually operable seat slide lock release member to detect the position of the seat slide lock release mechanism for detecting a lock release condition of the seat slide mechanism for producing an electric signal indicative of the lock release condition of the seat slide mechanism; and
   an electric actuator means, associated with said emergency locking mechanism and comprising electromagnetically operable solenoid movable between a normal position allowing inertial responsive movement of said locking member to establish locking engagement with said belt reel and a lock disabling position for restricting movement of said locking member, for disabling operation of said emergency locking mechanism while said electric signal exists.

8. A seat belt device as set forth in claim 7, wherein said seat slide detector switch means comprises and ON/OFF switch, plunger associated with said ON/OFF switch and movable between a seat slide locking position in which said switch is held OFF and a seat sliding position in which said switch is turned ON, and an actuation member cooperative with a seat slide lock releasing member to operate said plunger between said seat slide locking position and said seat sliding position.

9. A combination of an automotive seat belt device and an automotive seat arrangement, in which a seat belt retractor is mounted on a seat frame and movable with said seat frame, which combination includes a system for disabling seat belt locking operation of said seat belt retractor while a seat slide mechanism is operated at seat position adjusting position, said seat belt locking disabling system comprising:

an emergency locking mechanism incorporated in said seat belt retractor for establishing locking of the seat belt in response to a rapid deceleration of the vehicle with a deceleration magnitude greater than a preset value;

a seat slide detector switch means, provided in a seat slide mechanism of said automotive seat arrangement for detecting a seat slide lock release condition of the seat slide mechanism for producing an electric signal indicative of the lock release condition of the seat slide mechanism; and an actuator means, associated with said emergency locking mechanism and responsive to said electric signal, for disabling operation of said emergency locking mechanism while said electric signal exists.

10. A seat belt device as set forth in claim 9, wherein said emergency locking mechanism includes a rotary wheel member which is rotatable with a belt reel and a sensor means for monitoring inertia condition, and a locking member associated with said rotary wheel for establishing locking engagement with said rotary wheel for preventing said belt reel from rotating in belt extracting direction, and said actuator means restricts movement of said locking member for disabling locking of said emergency lock mechanism in response to said electric signal.

11. A seat belt device as set forth in claim 10, wherein said actuator means comprises electromagnetically operable solenoid movable between a normal position allowing inertia responsive movement of said locking member to establish locking engagement with said rotary wheel and a lock disabling position for restricting movement of said locking member.

12. A seat belt device as set forth in claim 11, wherein said seat slide detector switch means comprises an ON/-OFF switch, plunger associated with said ON/OFF switch and movable between a seat slide locking position in which said switch is held OFF and a seat sliding position in which said switch is turned ON, and an actuation member cooperative said plunger between said seat slide locking position and said seat sliding position.

13. A combination of an automotive seat belt device and an automotive seat arrangement, in which a seat belt retractor is mounted on a seat frame and movable with said seat frame, which combination includes a system for disabling seat belt locking operation of said seat belt retractor while a seat slide mechanism is operated at seat position adjusting position, said seat belt locking disabling system comprising:

said seat belt retractor unit including a reel on which a seat belt is wound, said belt reel being rotatable in a first direction for extracting the belt therefrom and in a second direction for retracting the belt, said retractor unit including an emergency locking mechanism associated with said belt reel and responsive to rapid deceleration of the vehicle establish locking of said belt reel for preventing said belt reel from rotating said first direction, which seat belt retractor is mounted on a framework of an automotive seat arrangement;

a seat slide detector switch means, provided in a seat slide mechanism of said automotive seat arrangement and associated with a manually operable seat slide lock release member to detect the position of the seat slide lock release means for detecting a lock release condition of the seat slide mechanism for producing an electric signal indicative of the lock release condition of the seat slide mechanism; and an actuator means, associated with said emergency locking mechanism and responsive to said electric signal, for disabling operation of said emergency locking mechanism while said electric signal exists.

14. A seat belt device as set forth in claim 13, wherein said emergency locking mechanism includes a rotary wheel member which is rotatable with said belt reel and a sensor means for monitoring inertia condition, and a locking member associated with said rotary wheel for establishing locking engagement with said rotary wheel for preventing said belt reel from rotating in belt extracting direction, and said actuator means restricts movement of said locking member for disabling locking of said emergency lock mechanism in response to said electric signal.

15. A seat belt device as set forth in claim 14, wherein said actuator means comprises electromagnetically operable solenoid movable between a normal position allowing inertial responsive movement of said locking member to establish locking engagement with said rotary wheel and a lock disabling position for restricting movement of said locking member.

16. A seat belt device as set forth in claim 15, wherein said seat slide detector switch means comprises and ON/OFF switch, plunger associated with said ON/OFF switch and movable between a seat slide locking position in which said switch is held OFF and a seat sliding position in which said switches is turned ON, and an actuation member cooperative with a seat slide lock releasing member to operate said plunger between said seat slide locking position and said seat sliding position.

17. A combination of an automotive seat belt device and an automotive seat arrangement, in which a seat belt retractor is mounted on a seat frame and movable with said seat frame, which combination includes a system for disabling seat belt locking operation of said seat belt retractor while a seat slide mechanism is operated at seat position adjusting position, said seat belt locking disabling system comprising:

an emergency locking mechanism incorporated in said seat belt retractor for establishing locking of the seat belt in response to a rapid deceleration of the vehicle with a deceleration magnitude greater than a preset value, said emergency locking mechanism includes a locking member pivotable between a locking position and unlocking position, and an inertia sensing means whch is responsive to an inertia moment to be exerted on the vehicle by rapid deceleration of the vehicle in a magnitude greater than said preset value, said inertia sensing means responsive to said inertia moment grater than a given magnitude which corresponds to the preset deceleration value to pivotally operate said locking member in locking direction said unlocking position to said locking position;

a seat slide detector switch means, provided in a seat slide mechanism of said automotive seat arrangement for detecting a seat slide lock release condition of the seat slide mechanism for producing an electric signal indicative of the lock release condition of the seat slide mechanism; and an actuator means, associated with said locking member said emergency locking mechanism and responsive to said electric signal, for preventing pivotal movement of said locking member in locking direction for disabling operation of said emergency locking mechanism while said electric signal exists.

18. A seat belt device as set forth in claim 17, wherein said emergency locking mechanism includes a rotary wheel member which is rotatable with a belt reel and a sensor means for monitoring inertia condition, and said locking member associated with said rotary wheel for establishing locking engagement with said rotary wheel for preventing said belt reel from rotating in belt extracting direction, and said actuator means restricts movement of said locking member for disabling locking of said emergency lock mechanism in response to said electric signal.

19. A seat belt device as set forth in claim 18, wherein said actuator means comprises electromagnetically operable solenoid movable between a normal position allowing inertia responsive pivotal movement of said locking member in said locking direction to establish locking engagement with said rotary wheel and a lock disabling position for restricting pivotal movement of said locking member.

20. A seat belt device as set forth in claim 19, wherein said seat slide detector switch means comprises an ON/OFF switch, plunger associated with said ON/OFF switch and movable between a seat slide locking position in which said switch is held OFF and a seat sliding position in which said switches is turned ON, and an actuation member cooperative said plunger between said seat slide locking position and said seat sliding position.

21. A combination of an automotive seat belt device and an automotive seat arrangement, in which a seat belt retractor is mounted on a seat frame and movable with said frame, which combination includes a system for disabling seat belt locking operation of said seat belt retractor while a seat slide mechanism is operated at seat position adjusting position, and seat belt locking disabling system comprising:

said seat belt retractor unit including a reel on which a seat belt is wound, said belt reel being rotatable in a first direction for extracting the belt therefrom and in a second direction for retracting the belt, said retractor unit including an emergency locking mechanism incorporated in said seat belt retractor for establishing locking of the seat belt in response to a rapid deceleration of the vehicle with a deceleration magnitude greater than a preset value, said emergency locking mechanism includes a locking member pivotable between a locking position and unlocking position, and an inertia sensing means which is responsive to an inertia moment to be exerted on the vehicle by rapid deceleration of the vehicle in a magnitude greater than said preset value, said inertia sensing means responsive to said inertia moment greater than a given magnitude which corresponds to the preset deceleration value to pivotally operate said locking member in locking direction from said unlocking position to said locking position;

a seat slide detector switch means, provided in a seat slide mechanism of siad automotive seat arrangement and associated with a manually operable seat slide lock release member to detect the position of the seat slide lock release means for detecting a lock release condition of the seat slide mechanism for producing an electric signal indicative of the lock release condition of the seat slide mechanism; and an actuator means, associated with said emergency locking mechanism and responsive to said electric signal, for disabling operation of said emergency locking mechanism while said electric signal exists.

22. A seat belt device as set forth in claim 21, wherein said emergency locking mechanism includes a rotary wheel member which is rotatable with a belt reel and a sensor means for monitoring inertia condition, and said locking member associated with said rotary wheel for establishing locking engagement with said rotary wheel for preventing said belt reel from rotating in belt extracting direction, and said actuator means restricts movement of said locking member for disabling locking of said emergency lock mechanism in response to said electric signal.

23. A seat belt device as set forth in claim 22, wherein said actuator means comprises electromagnetically operable solenoid movable between a normal position allowing inertia responsive pivotal movement of said locking member in said locking direction to establish locking engagement with said rotary wheel and a lock disabling position for restricting pivotal movement of said locking member.

24. A seat belt device as set forth in claim 23, wherein said slide detector switch means comprises an ON/OFF switch, plunger associated with said ON/OFF switch and movable between a seat slide locking position in which said switch is held OFF and a seat sliding position in which said switches is turned ON, and an actuation member cooperative said plunger between said seat slide locking position and said seat sliding position.

* * * * *